United States Patent
Agarwal et al.

(10) Patent No.: US 12,153,598 B1
(45) Date of Patent: Nov. 26, 2024

(54) METHOD OF EXTRACTING TECHNICAL INFORMATION FROM A TECHNICAL MANUAL

(71) Applicant: General Electric Company, Schenectady, NY (US)

(72) Inventors: Anurag Agarwal, Bengaluru (IN); Gokul Puthumanaillam, Chennai (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/451,943

(22) Filed: Aug. 18, 2023

(30) Foreign Application Priority Data

Jun. 29, 2023 (IN) .............................. 202311043636

(51) Int. Cl.
 *G06F 16/25* (2019.01)
 *G06N 20/10* (2019.01)

(52) U.S. Cl.
 CPC ........... *G06F 16/254* (2019.01); *G06N 20/10* (2019.01)

(58) Field of Classification Search
 None
 See application file for complete search history.

(56) References Cited

U.S. PATENT DOCUMENTS

| | | | |
|---|---|---|---|
| 8,428,813 B2 | 4/2013 | Gilbert | |
| 9,949,697 B2 | 4/2018 | Iscoe et al. | |
| 10,360,601 B1 | 7/2019 | Adegan | |
| 11,023,824 B2 | 6/2021 | Kida | |
| 11,334,854 B2 | 5/2022 | Chiaramonte et al. | |
| 2006/0235707 A1 | 10/2006 | Goldstein et al. | |
| 2016/0307201 A1* | 10/2016 | Turgeman | G06F 21/316 |
| 2017/0195356 A1* | 7/2017 | Turgeman | H04L 63/08 |
| 2018/0349398 A1* | 12/2018 | Ardite | G06F 16/432 |
| 2019/0146446 A1 | 5/2019 | Abernathy et al. | |
| 2020/0334607 A1 | 10/2020 | Fadel et al. | |
| 2021/0248845 A1 | 8/2021 | Nakhjavani | |
| 2022/0027855 A1* | 1/2022 | Aluvala | G06F 16/90332 |
| 2022/0300653 A1* | 9/2022 | Wrenn | G06F 21/6272 |
| 2022/0374113 A1 | 11/2022 | Meriaz et al. | |

FOREIGN PATENT DOCUMENTS

| | | |
|---|---|---|
| CN | 114842146 A | 8/2022 |
| WO | 2018031656 A1 | 2/2018 |
| WO | 2019092248 A1 | 5/2019 |

\* cited by examiner

*Primary Examiner* — Christopher J Raab
(74) *Attorney, Agent, or Firm* — Venable LLP; Michele V. Frank

(57) ABSTRACT

A method of extracting information from a technical manual. The method includes extracting selected keywords from the technical manual, appending the selected keywords to a table to provide master data, receiving a portion of the master data and a first table of labels corresponding to a portion of the master data, applying a Machine Learning model or a Natural Language Processing (NLP) model to generate a second table of labels corresponding to an entire master data, processing labels in the second table of labels to correspond to the master data, and outputting an updated second table of labels to match with the master data to extract information from the technical manual to enable a user to review or to use, or both, the information contained in the technical manual without reading or searching in the entire technical manual.

20 Claims, 7 Drawing Sheets

Input from Engine Manual — 106

| | ENG | Item ID | FID | Operate | DisplayText |
|---|---|---|---|---|---|
| 1 | | | | | |
| 475 | A121-C | C1-1234 | C1-1234 | 123 | Measure Dimension A of the A-type seal at six equally spaced locations. |
| | A272-C | C1-1235 | C1-1235 | 124 | Is adjust washer (adjust washer) replacement is necessary, calculate the correct thickness. |

FIG. 3A

Predicted Output — 106

| AT ▽ | Potential MIC | ▽ | Extracted MICs | SGM |
|---|---|---|---|---|
| | MIC_1 Record Dimension A1, Record Dimension A2, Record Dimension A3, Record Dimension A4, Record Dimension A5, Record Dimension A6  ← 302 ← 300 | | Record Dimension L1,<br>Record Dimension K1,<br>Record Dimension K2,<br>Record Dimension K3,<br>Record Dimension K4,<br>Record Id Dimension J1,<br>Record Id Dimension J2,<br>Record Id Dimension J3,<br>Record Id Dimension J4,<br>Record Average Dimension K1,<br>Record Average Dimension J1  } 304 | |
| | MIC: Record Thickness | | | |

FIG. 3B

METHOD OF EXTRACTING TECHNICAL INFORMATION FROM A TECHNICAL MANUAL

CROSS REFERENCE TO RELATED APPLICATIONS

The present application claims the benefit of Indian Patent Application No. 202311043636, filed on Jun. 29, 2023, which is hereby incorporated by reference herein in its entirety.

TECHNICAL FIELD

The present disclosure relates generally to technical information in technical manuals and, in particular, to a method of extracting information from a technical manual.

BACKGROUND

Technical manuals of aircraft engines or other aircraft systems can have a relatively large size. As a result, manually extracting Master Inspection Characteristics (MICs) information and/or other information such as notes and cautions from an aircraft engine manual consumes a lot of time and energy. In addition, the process of extracting MICs information and/or other information can be prone to human errors. Considering the complexity of aircraft engines, the MICs information can be very valuable to the engineers working on the aircraft engines. However, errors in extracting the MICs information may slow down or pause the work performed. In addition, finding and extracting desired technical information from the relatively large content size of the technical manual may not be practical as this may take time.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 3A shows an example of an input from the MICs information from an engine manual, according to an embodiment of the present disclosure.

FIG. 3B shows an example of a predicted output from a Machine Learning (ML) model, according to an embodiment of the present disclosure.

DETAILED DESCRIPTION

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

Embodiments of the present disclosure seek to provide a method of extracting Master Inspection Characteristics (MICs) information from a technical manual (e.g., an engine manual) in an efficient manner. The method uses a scalable end-to-end architecture with a Machine Learning (ML) backbone to completely automate the process of extracting the information from the technical manual in a fraction of time in comparison to manual work. This method also compensates on the accuracy of extraction, computational power or the time consumed for the process. The present method reduces the time taken and the manual labor by a large amount to accurately extract the information from the technical manuals and organizes the extracted MICs information in an engineer-friendly manner.

As a result, Master Inspection Characteristics (MICs) information and/or other information such as notes and cautions can be extracted from relatively large text based manuals. In some embodiments, the method can be based on a ML architecture with Linear Support Vector Machine (SVM) Classifier coupled with Chi Square correlation. The present method can be tailored to extract information from the technical manual and organize the information in a desired manner that can be quickly understood by a technical user. The present method can be utilized to extract not only the MICs information but also any other information.

Figure 1:
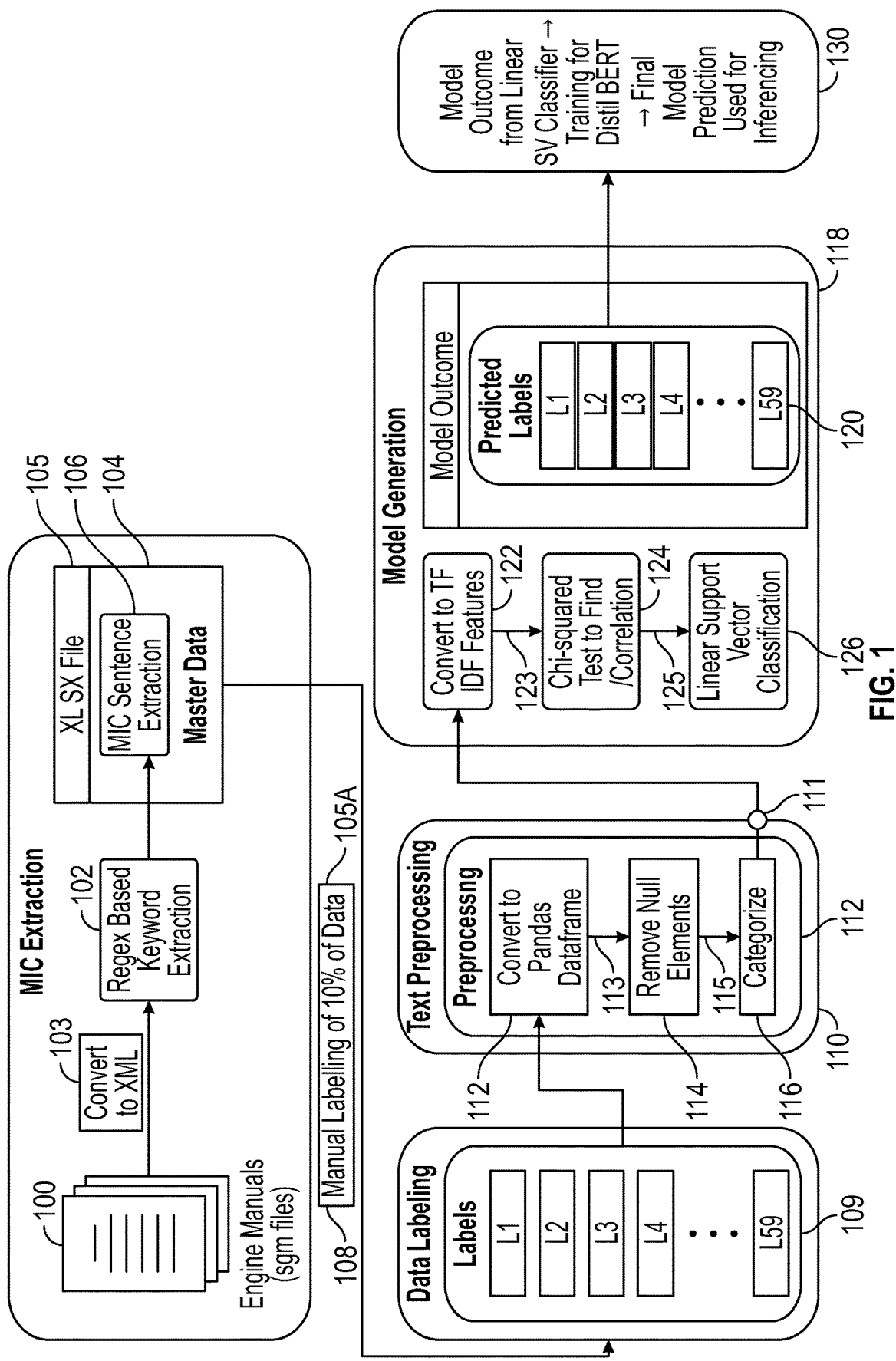
FIG. 1 is a diagram of a system of extracting technical information from a technical manual, according to an embodiment of the present disclosure.
Figure 6:
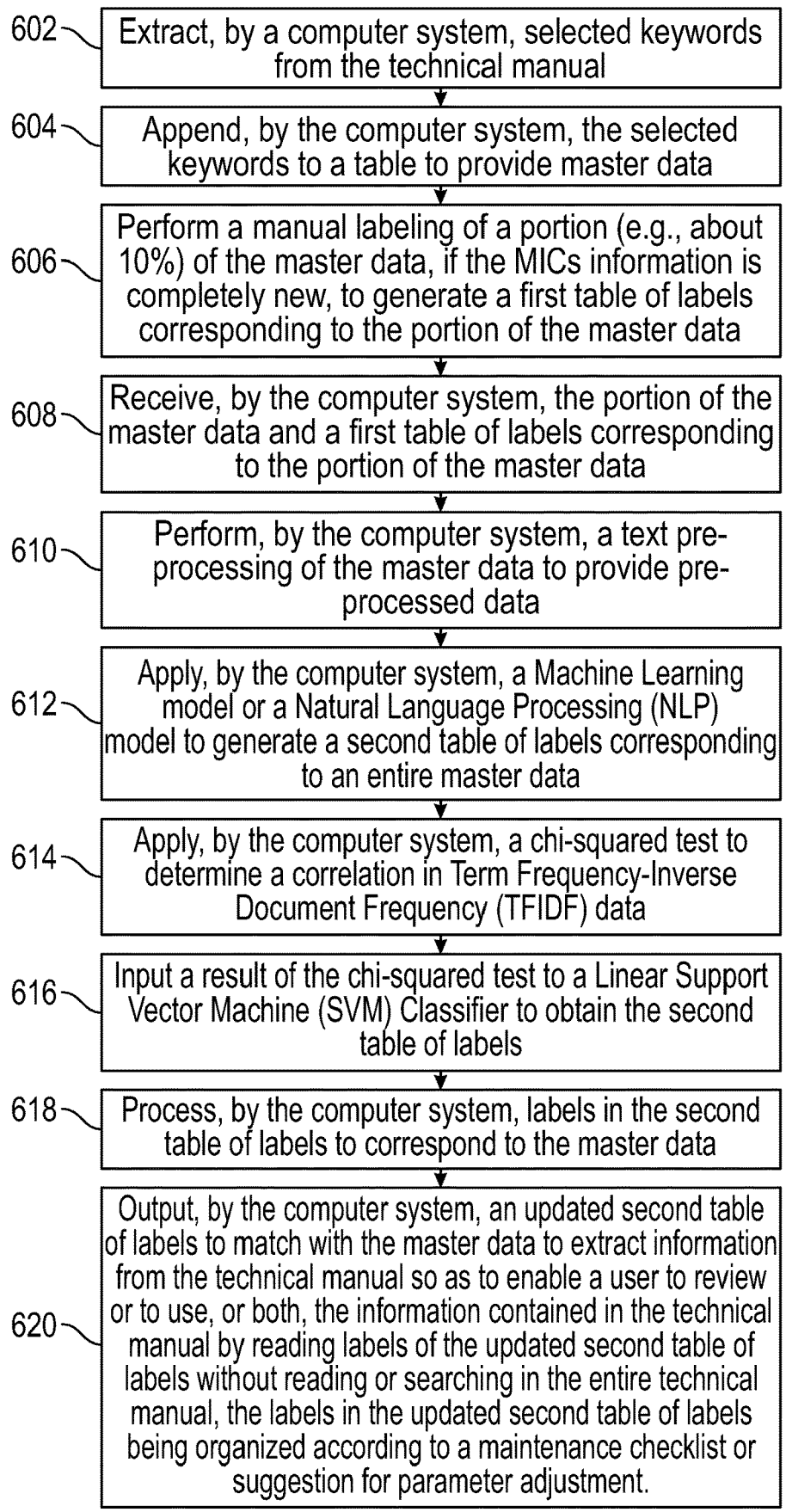
FIG. 6 is a flow diagram of a method of extracting technical information from a technical manual, according to an embodiment of the present disclosure.

FIG. 1 is a diagram of a system of extracting technical information from a technical manual, according to an embodiment of the present disclosure. FIG. 6 is a flow diagram of a method of extracting technical information from a technical manual, according to an embodiment of the present disclosure. Referring to both FIGS. 1 and 6, the method includes extracting, by a computer system, selected keywords from the technical manual 100 using, for example, a Regex-based extraction procedure 102, at 602. Regex is short for "regular or rational expression." Regex is a sequence of characters that specifies a search pattern in a text. Usually, such patterns are used by string-searching algorithms for "find" or "find and replace" operations on strings, or for input validation. In an embodiment, prior to extracting the keywords by performing the Regex-based extraction procedure 102, the technical manual 100 is converted from a first file-type, such as Standard Generalized Markup (SGM), Portable Document Format (PDF), Text (TXT), Document (DOC/DOCX), Rich Text Format (RTF), Hyper Text Markup Language (HTML or HTM), EXCEL (XLSX), LaTeX (LATEX), etc., into a second file type, such as the Extensible Markup Language (XML), at 103.

The Regex-based extraction procedure 102 is used to extract certain relevant keywords from the technical manual 100. The method includes appending, by the computer system, the extracted relevant keywords to a table, for example a spreadsheet file such as EXCEL (XLSX) sheet file 104 to form a master data 105, at 604. The master data 105 in the XLSX sheet file 104 is an organized document that has all details regarding Master Inspection Characteristics (MICs) information 106 from the technical manual 100. The MICs information 106 can be used by engineers to quickly identify the MICs information 106 of their requirement. The master data 105 containing the MICs information 106 serves as the dataset for the entire Machine Learning (ML) model.

The method includes performing a manual labelling 108 of a portion 105A (e.g., about 10%) of the master data 105, if the MICs information 106 is completely new to generate a first table of labels 109 corresponding to the portion 105A of the master data 105, at 606. The manual labelling 108 to generate the first table of labels 109 is performed to train the ML model to predict and generate the MICs information 106 from the master data 105, at 606. The method includes inputting the portion 105A of the master data 105 and the first table of labels 109 corresponding to the portion 105A of the master data 105 to a computer system implementing the method. The method includes receiving, by the computer system, the portion 105A of the master data 105 and the first table of labels 109 corresponding to the portion 105A, at 608.

The method may proceed to perform, by the computer system, a text pre-processing 110 of the master data 105 to provide pre-processed data 111, at 610. In an embodiment, the text pre-processing 110 includes using Pandas dataframe 112 to provide PANDAS pre-processed data 113. PANDAS (derived from the term "panel data" and "python data analysis") is a software library written for the Python programming language for data manipulation and data analysis. PANDAS provides data structures and operations for manipulating numerical tables and time series. PANDAS allows various data manipulation operations such as merging, reshaping, selecting, as well as data cleaning. An example of cleaning data includes removal of null character, hyper-links, punctuation marks, etc. For example, specific libraries from Pandas can be used for data cleaning purposes. The text pre-processing 110 may be performed to clean text data. The text pre-processing 110 further includes removing null elements and stop words from the Pandas pre-processed data 113, at 114, to provide cleaned data 115. The text pre-processing includes categorizing the cleaned data 115, at 116, to obtain the pre-processed data 111. Although PANDAS is used in a python environment, other libraries similar to PANDAS can be used when implementing in other programming languages (such as, for example, C, C++, R, or Java languages) environments.

The method further includes generating the ML model 118 and applying the ML model 118 to the preprocessed data 111 to generate a second table of labels 120 corresponding to an entirety of the master data 105, at 612. In an embodiment, the pre-processed data 111 is converted into Term Frequency—Inverse Document Frequency (TF-IDF) 122 features using a TFidVectorizer to obtain a TF-IDF data 123. Any machine learning process can be used for numerical data but not text data. Therefore, a process which convert text into numerical data is used. In this instance, TF-IDF can be used as it uses the term frequency and inverse document frequency thus negating the presence of widely used words. TF-IDF is an algorithm that uses the frequency of words to determine how relevant the words are to a given document. TF-IDF is a measure of originality of a word by comparing the number of times (i.e., how frequent) the word appears in a document with the number of documents the word appears in. TF-IDF transforms text into meaningful representation of numbers to fit machine algorithm for prediction. For example, countvectorizer and tfidftransformer from the sklearn library can be used to convert text into TF-IDF sparse matrix can be used.

The method includes applying a chi-squared test 124 to determine a correlation in the TF-IDF data 123, at 614. The chi-squared test is a statistical hypothesis test used in the analysis of contingency tables when the sample sizes are relatively large. The chi-squared test is primarily used to examine whether two categorical variables (two dimensions of a contingency table), for example, are independent in influencing the test statistic (values within the contingency table). There are many types of chi-squared tests including the Pearson's test, Fisher's test, the binomial test, the McNemar's test, etc. Chi-squared test is conducted to remove a correlation in the input parameters. This test is useful if the input data has categorical variable as well.

The method includes inputting a result 125 of the chi-squared test 124 to a Linear Support Vector Machine (SVM) Classifier 126 to obtain the second table of labels 120, at 616. The SVM Classifier 126 is a supervised machine learning model that is used to analyze data for classification and regression analysis and outliers detection. In addition to performing linear classification, SVM classifiers can also perform a non-linear classification where desired. However, in the example implementation, the SVM Classifier 126 is a Linear SVM Classifier. Instead of or in addition to the SVM classifier, other models can also be used such, for example, a Tree Based Model (e.g., Random Forest Method, Decision Tree, XGBoost Model, etc.), and/or a Logistic Regression. In this case, Support Vector Machine (SVM) method is used for classification where data is separated by creating hyperplanes to categorize the data into different classes appropriately.

The method further includes post-processing the labels in the second table of labels 120 to match the MICs information 106 in the master data 105, at 130, at 618. The method includes outputting an updated second table of labels to match with the master data to extract information from the technical manual so as to enable a user to review or to use, or both, the information contained in the technical manual by reading labels of the updated second table of labels without reading or searching in the entire technical manual, at 620. In an embodiment, the labels in the updated second table of labels are organized according to a maintenance checklist or suggestion for parameter adjustment. A data-size of the technical manual is at least five times greater than a data-size of the updated second table of labels. In an embodiment, the post-processing 130 includes training using Distil BERT to match the MICs information 106 to the labels in the second table of labels 120. Distil BERT is a transformer model trained by distilling Bidirectional Encoder Representations from Transformers (BERT) base. The BERT base is an encoder stack of transformer architecture. The BERT base has 12 layers in the encoder stack. BERT is pre-trained on language modeling and next sentence prediction. BERT learns latent representations of words and sentences in context. After, pre-training, BERT can be finetuned with fewer resources on smaller datasets to optimize performance on specific tasks such as language inference and text classification and sequence to sequence-based language generation tasks. As described in the above paragraphs, first, the SVM model is tuned on the training data and labels are generated which reduces the time for annotating the labels. Using the SVM model, labels are generated, and this becomes the input data for Distil BERT model. The Distil BERT model captures the domain wise keyword. The Distil Bert model can be been fine-tuned with the domain key words.

Figure 2A:
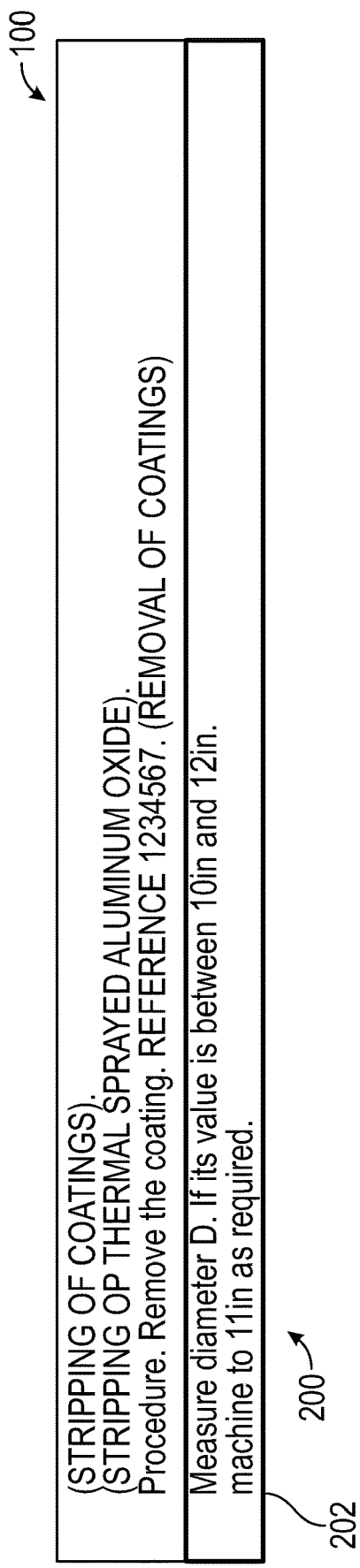
FIG. 2A is a sample text found in the technical manual, according to an embodiment of the present disclosure.

FIG. 2A is a sample text 200 found in the technical manual 100, according to an embodiment of the present disclosure. For example, as shown in FIG. 2A, the technical manual 100 includes a check list such as the check list 202 of measuring and recording a diameter, and measuring balance in different planes and at two different engine rotations per minute (RPMs). The check list 202 (including, for example, the diameter and measuring balance in different planes and at two different rotations per minute) may contain information that a user wants to highlight and extract from the technical manual 100. The above described method is applied to the technical manual 100, as described at 602 and 604 in FIG. 6, to extract the information in the check list 202 and to organize the information into a table (e.g., XLSX file 105 shown in FIG. 1), as shown in FIG. 2B.

Figure 2B:
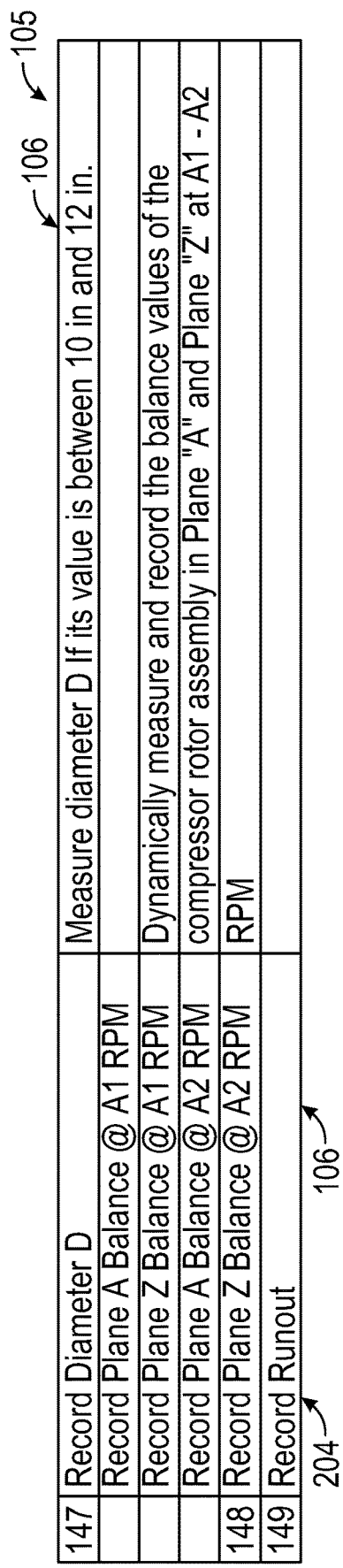
FIG. 2B is a sample of Master Inspection Characteristics (MICs) information in a master data extracted from the technical manual, according to an embodiment of the present disclosure.

FIG. 2B is a sample 204 of MICs information 106 in master data 105 (shown in FIG. 1), according to an embodiment of the present disclosure. In the embodiment shown in FIG. 2B, the MICs information 106 is organized in an XLSX file. The sample 204 of MICs information 106 contains, for example, a row specifying "Record Diameter D" and "Measure diameter D if its value is between 10 in and 12 in." The sample 204 of MICs information 106 also contains, for example, a row regarding "recording balance values of the compressor rotor in different plane and at different RPMs." For example, the sample 204 of the MICs 106 regarding measuring the diameter D and recording balance values of the compressor rotor in different planes and at different RPMs can be used as part of the training dataset (e.g., part of the portion 105A of the MICs information 106). The use of sample 204 of the MICs 106 (in this example, having the measure of the diameter and the record of balance values) can be used, for example, as a training dataset. The training dataset is created by manual labeling 108 (shown in in FIG. 1) and described at 606 in FIG. 6, to generate a first table of labels corresponding to the portion of the master data (in this example, the sample 204 containing the measure of the diameter and the record of balance values). This data can be used to train the ML model 118 to create a correspondence between the words "measure diameter" and "record in various planes and at different RPMs" in the technical manual 100 and the specific checklist items "record diameter" and "record plane A balance at A1 RPMs" in the resulting table of labels 109, shown in FIG. 1.

FIG. 3A shows an example of an input from the MICs information 106 from an engine manual, according to an embodiment of the present disclosure. In this embodiment, MICs information 106 from master data 105 in the technical manual 100 is input to the ML model 118. For example, as shown in FIG. 3A, "measure dimension A of the A-type seal at six equally spaced locations" is input to the ML model 118. The ML model 118 then computes, based on the portion 105A of the MICs information 106 as the training data set, to predict the second table of labels 120 corresponding to the entirety of the master data 105. Therefore, as shown at 608 through 612 in FIG. 6, the computer system receives the portion 105A of the master data 105 and the first table of labels 109 corresponding to portion 105A of the master data to then predict the second table of labels 120, as shown in FIG. 1.

FIG. 3B shows an example of a predicted output 300 from the ML model 118, according to an embodiment of the present disclosure. In the present example, the ML model 118 computes, as shown at 612 in FIG. 6, based on the portion of the sample 204 of MICs information 106 regarding measuring the diameter D and recording balance values of the compressor rotor in different planes and at different RPMs to predict the organization of the statement, "measure dimension A of the A-type seal at six equally spaced locations" into predicted MICs 302 including "record dimension A1, record dimension A2, . . . , record dimension A6." By specifically listing each measurement of the six dimensions at the six locations, a technician can easily note if measurement data is missing due to inattention, or the like, and, thus, human error can substantially be reduced or prevented. The predicted output 300 by the ML model 118 "record dimension A1, record dimension A2, . . . , record dimension A6" can be compared to the extracted MICs 304 "record dimension L1, record dimension K1, . . . , record id dimension J4, . . . , record average dimension K1, record average dimension J1." In this example, "record dimension A1, record dimension A2, . . . , record dimension A6" can be compared to the extracted MICs 304 "record dimension L1, record dimension K1, . . . , record id dimension J4, . . . , record average dimension K1, record average dimension J1" correspond to the labels "L1, L2, . . . " in the second table of labels 120. As noted, in this example, there is a good agreement between manually extracted MICs 304 corresponding to the first table of labels 109 and the predicted MICs 302 corresponding to the second table of labels 120 shown in FIG. 1. In general, the present ML model 118 has an initial accuracy of at least 93%. This accuracy can be improved by training with more data (e.g., more than 10% from the same technical manual) and/or using other data from different engine manuals.

In addition, the present method is computationally light owing to the relatively simple and effective architecture. The present method is modular as the method can be implemented keeping in mind the new MICs/features that can be added in the future. Furthermore, new modules can easily be integrated to the current architecture without hindering the functioning of any of the older modules.

The present method reduces human labor by a very large margin as it takes only a fraction of time (less than a minute) to extract, to cleanse and to label the technical manual data compared to a manual extraction. However, about only a small portion (about 10%) of the data is initially manually labeled to train the ML model. This small portion of the data is only needed in the case when there is new MICs information to be extracted. If there is no new MICs information added to be extracted, then the manual training may not be needed. This feature is not only helpful from the perspective of reduction of labor but also saves invaluable time.

The present method can also be scaled up to accurately extract data from any technical manual (e.g., engine manual). The present method can also be scaled up to extract any information (other than MICs) from the technical manual. The present method also provides an output that can be stored as an organized file which can be easily read by users. The present method enables a user to quickly review or to use, or both, information contained in the technical manual without having to read or to search in the entire technical manual. The extracted data can be organized according to a maintenance checklist or a suggestion for parameter adjustment, and a data-size of the technical manual is at least five times greater than a data-size of the extracted data.

In addition, while the technical manual 100 (e.g., engine manual) can have a larger data size (between 10 MB and 100 MB), the data size of the resulting extracted second table of labels 120 is smaller (between 1 MB and 2 MB). Therefore, the amount of data to be analyzed by the engineer is drastically reduced. In an embodiment, the data size of the technical manual 100 is at least five times greater than a data size of the second table of labels. As a result, the user (e.g., engineer) can quickly find a specific label (e.g., a specific parameter in the technical manual). The outcome of this approach is a consolidated tabular inspection checklist (updated second table of labels) which encapsulate all the possible information without missing quality information as shown in FIG. 3B. This Tabular view eliminate the possibility of human error in creating the checklist in addition to time saving.

The present method is tested on an aircraft engine manual having more than 64000 lines of text (e.g., SGM file). More than 1,400 MICs (organized as a XLSX file, for example) are extracted from the 64,000 lines. Initially, 150 MICs (approximately 10% of the data) are manually labelled to train the ML model. The present method is then tested on completely unseen data in the more than 1400 MICs. Various ML models can be used including Random Forest, Logistic Regression, Multinomial Naive Bayes, and Linear Support Vector Machines to extract the labels on the all the MICs information. An initial accuracy of greater or equal to 93.7% (about 94%) can be achieved. This accuracy can further be improved by initially manually labelling more data.

Figure 4:
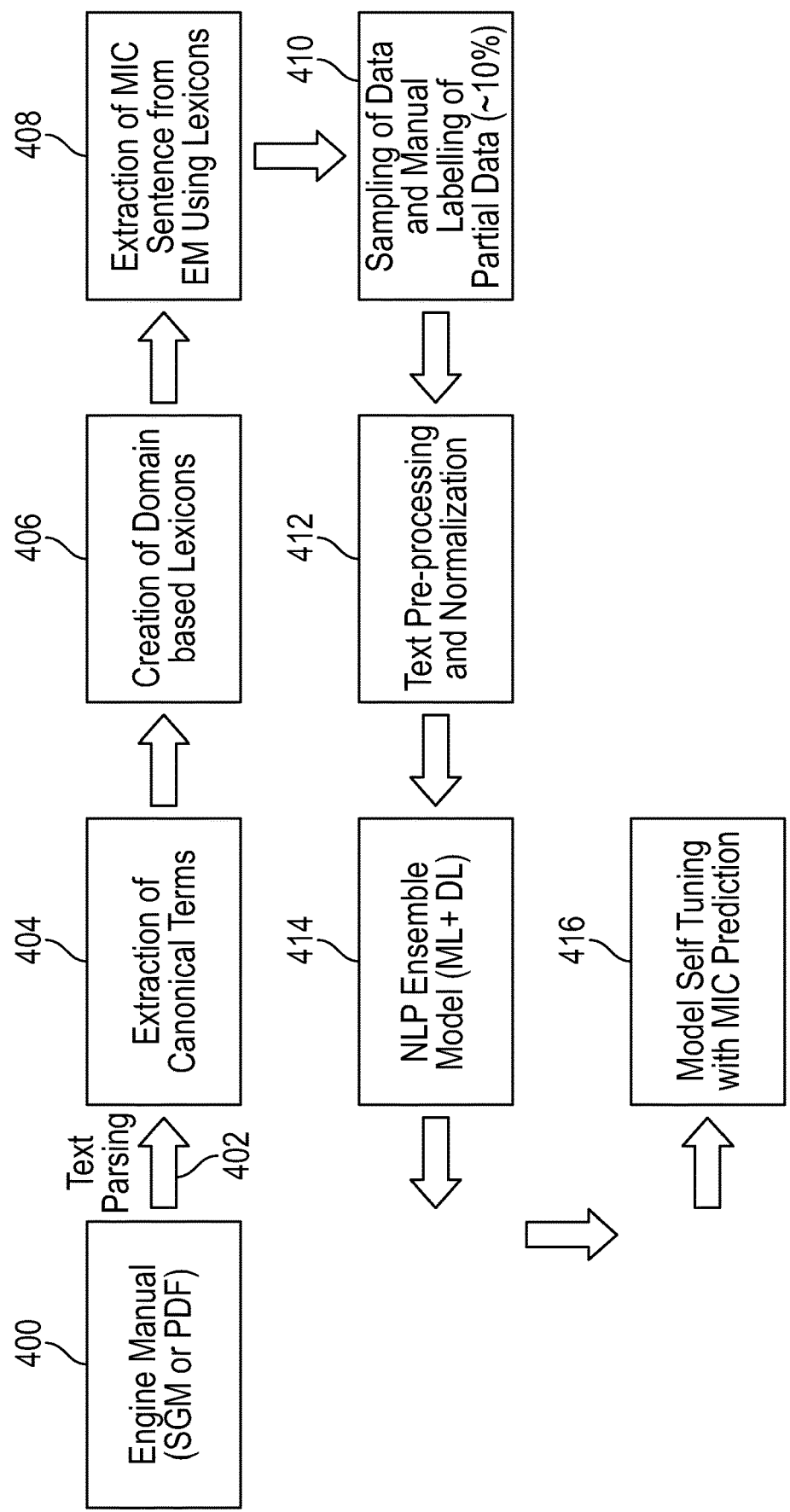
FIG. 4 is a diagram of a system of extracting technical information from the technical manual, according to another embodiment of the present disclosure.

FIG. 4 is a flow diagram of a method of extracting technical information from a technical manual, according to another embodiment of the present disclosure. The method includes parsing 402 the text of technical manual 400 (e.g., engine manual) and extracting canonical terms 404 from the technical manual 400 using, for example, a Regex-based extraction procedure. In an embodiment, prior to performing the Regex-based extraction procedure, converting the technical manual 400 from a first file-type, such as the Standard Generalized Markup (SGM) or the Portable Document Format (PDF) into a second file type, such as Extensible Markup Language (XML).

The method includes creating domain-based lexicons 406. In an embodiment, creating the domain-based lexicons 406 includes selecting keywords depending on a field of interest of the technical manual 400. For example, the technical manual 400 can be an engine manual and the field of interest can be the electrical configuration of the engine or the mechanical configuration of the engine. For example, if the field of interest is the electrical configuration of the engine, then the lexicons are focused on terms such as voltage, current, electrical connection, electrical power, etc. For example, if the field of interest is the mechanical configuration of the engine, then the lexicons are focused on terms such as combustor, air flow, rotation, diameter, etc. Lexicons are domain terms which are built to add into the vocabulary of the deep learning model. The manual may have both mechanical and electrical terminology, however, if the lexicons are created for the mechanical domain, MIC data can be captured for the mechanical domain only.

The method includes, following the creation of the domain-based lexicons 406, extracting the MIC sentence or MIC data 408 from the technical manual 400 based on the domain-based lexicons 406. The method also includes sampling of MIC data 408 and manually labeling a portion 410 of MIC data 408. Annotation of the labels can be the most "painful" task in Machine Learning model building. In this process, only a portion of the data is used for the labeling and model has been trained on the partial labeled data and used for the inferencing on the remaining data, thus, time for annotating the remaining data is considerably low.

The method includes performing a text pre-processing of the MIC data 408 and normalizing to provide pre-processed data 412. In an embodiment, the text pre-processing includes using Pandas data-frame to provide PANDAS pre-processed data, as described in the above paragraphs with respect to FIG. 1.

The method includes applying an Artificial Intelligence (AI) model such as a Natural Language Processing (NLP) model 414 to the pre-processed data 412 to provide a table of labels predicting the MIC data 408. The NLP model, Machine Learning (ML) model and/or Deep Learning (DL) model can be used as an AI model. A ML model includes, for example, any one of a Linear a Linear Support Vector Machine (SVM) Classifier model, as described in the above paragraphs with respect to FIG. 1. The method includes self-tuning 416 the NLP model 414 depending on the table of labels predicting the MIC data 408. The Machine learning model is used to eliminate the annotation process. Initially only a portion of the training data is labelled which is a time-consuming process and the ML model is used to generate the labels for the remaining data.

In the above paragraphs, although the method is described herein with respect to a technical manual, the present method can be applied to any type of manual and more broadly to any type of text or manuscript where specific keywords need to be extracted. For example, although, in the above paragraphs, the present method is applied to an engine manual (such as an aircraft engine manual) for illustration, the present method can also be applied to any type of technical manual such as a medical device manual, a mechanical device manual, an electronic device manual, etc. In addition, the present method can also be applied to a manual of an engine or a system of an automotive vehicle (e.g., a car, a van, a sport utility vehicle, a truck), or an engine or a system of a boat/ship, a watercraft, or a train, etc. The creation of the table from the engine manual eliminates the possibility of a human error in documenting and inspection. This also allows the automation of creation of the task summary from the engine manual.

Currently the creation of MIC process is a manual process and a subject matter expert (SME) is needed to read through the manual and create the task list. The present system and method create a task list from the engine manual in a much faster manner with no human error of missing a task item. The process of fetching text using NLP and creating a task item from the fetched text specific to a desired task using NLP is novel.

Figure 5:
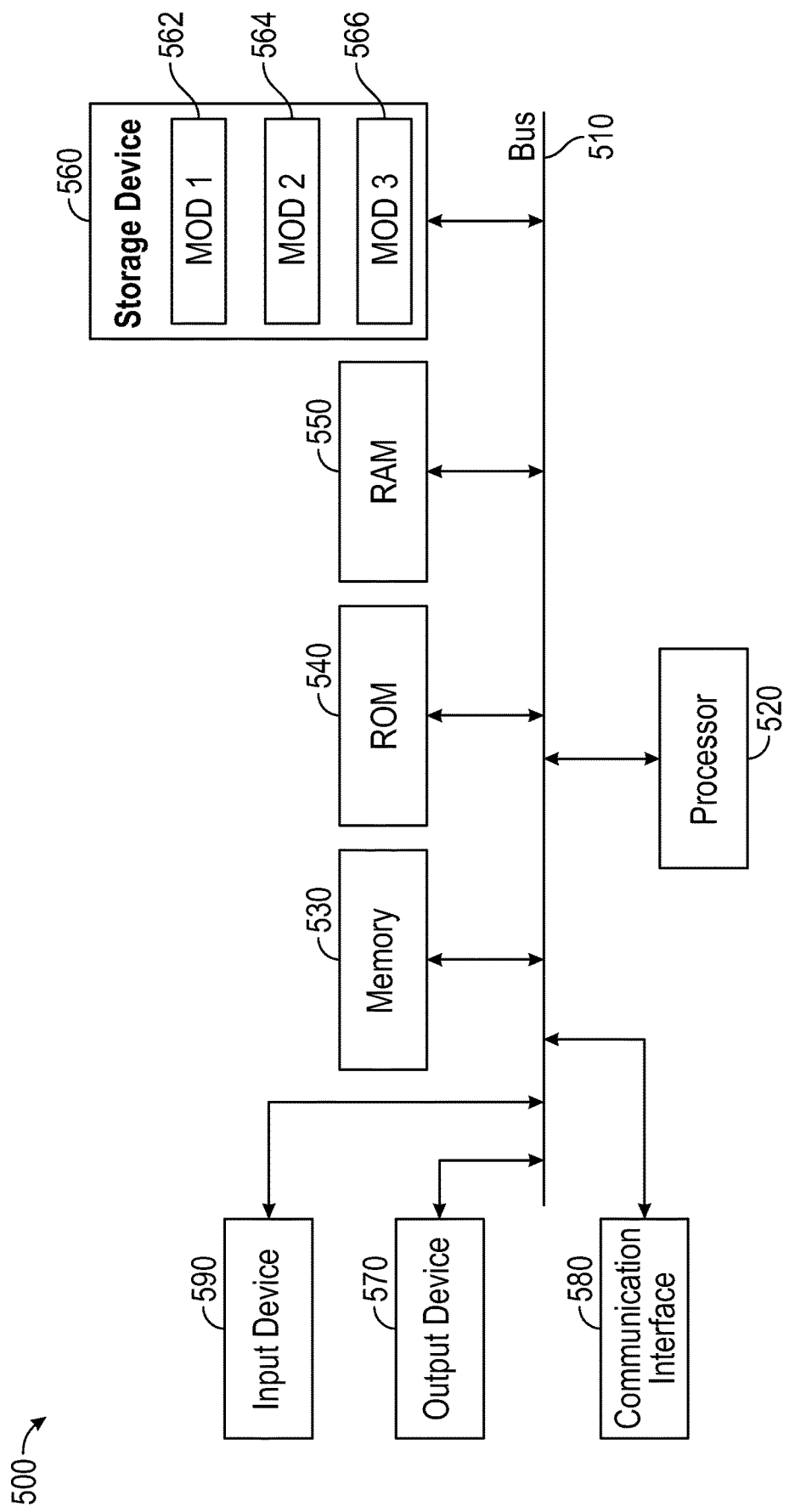
FIG. 5 is a schematic diagram of a computer system for implementing the methods of extracting information from the technical manual, according to an embodiment of the present invention.

FIG. 5 is a schematic diagram of a computer system 500 for implementing the methods of extracting information from a technical manual, according to an embodiment of the present invention. With reference to FIG. 5, the computer system 500 includes a general-purpose computing device, including a central processing unit (a CPU or a processor) 520 and a system bus 510 that couples various system components including the memory 530 such as a read-only memory (ROM) 540 and random-access memory (RAM) 550 to the processor 520. The computer system 500 can include a cache of high-speed memory connected directly with, in close proximity to, or integrated as part of the processor 520. The computer system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other memory 530 may be available for use as well. The memory 530 can include multiple different types of memory with different performance characteristics. The disclosure may operate on a computer system 500 with more than one processor 920 or on a group or cluster of computing devices networked together to provide greater processing capability. The processor 520 can include any general-purpose processor and a hardware module or a software module, such as module 1, 562, module 2, 564, and module 3, 566 stored in storage device 560, configured to control the processor 520 as well as a special-purpose processor where software instructions are incorporated into the actual processor design. The processor 520 may essentially be a completely self-contained computer system, containing multiple cores or processors, a bus, a memory controller, a cache, etc. A multi-core processor may be symmetric or asymmetric.

The system bus 510 may be any of several types of bus structures including a memory bus or a memory controller, a peripheral bus, and a local bus using any of a variety of bus architectures. A basic input/output (BIOS) stored in memory ROM 540, or the like, may provide the basic routine that helps to transfer information between elements within the computer system 500, such as during start-up. The computer system 500 further includes storage devices 560 such as a hard disk drive, a magnetic disk drive, an optical disk drive, a tape drive, or the like. The storage device 560 can include software modules 562, 564, and 566 for controlling the processor 520. Other hardware or software modules are contemplated. The storage device 560 is connected to the system bus 510 by a drive interface. The drives and the associated computer-readable storage media provide non-volatile storage of computer-readable instructions, data structures, program modules, and other data for the computer system 500. In one aspect, a hardware module that performs a particular function includes the software component stored in a tangible computer-readable storage medium in connection with the necessary hardware components, such as the processor 520, the system bus 510, the output device 570 (e.g., display), and so forth, to carry out the function. In another aspect, the system can use a processor and a computer-readable storage medium to store instructions that, when executed by a processor (e.g., one or more processors), cause the processor to perform a method or other specific actions. The basic components and appropriate variations are contemplated depending on the type of device, such as whether the computer system 500 is a small, handheld computing device, a desktop computer, or a computer server.

Although the exemplary embodiment described herein employs the storage device 560 such as a hard disk, other types of computer-readable media that can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals, per se.

To enable user interaction with the computer system 500, an input device 590 represents any number of input mechanisms, such as a microphone for speech, a touch-sensitive screen for gesture or graphical input, a keyboard, a mouse, motion input, speech, and so forth. An output device 570 can also be one or more of a number of output mechanisms known to those of skill in the art. In some instances, multimodal systems enable a user to provide multiple types of input to communicate with the computer system 500. The communications interface 580 generally governs and manages the user input and system output. There is no restriction on operating on any particular hardware arrangement and, therefore, the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Further aspects of the present disclosure are provided by the subject matter of the following clauses.

A method of extracting information from a technical manual, the method being implemented on a computer system including one or more processors. The method includes (a) extracting, by a computer system, selected keywords from the technical manual, (b) appending, by the computer system, the selected keywords to a table to provide master data, (c) receiving, by the computer system, a portion of the master data and a first table of labels corresponding to portion of the master data, (d) applying, by the computer system, a Machine Learning model or a Natural Language Processing (NLP) model to the pre-processed data to generate a second table of labels corresponding to an entire master data, and (e) processing, by the computer system, labels in the second table of labels to correspond to the master data to enable a user to review or to use, or both, information contained in the technical manual without reading or searching in the entire technical manual. The data-size of the technical manual is at least five times greater than a data-size of the second table of labels.

The method of the preceding clause, wherein extracting keywords from the technical manual includes using a regular or a rational expression-based extraction procedure.

The method of any preceding clause, wherein the master data includes Master Inspection Characteristics (MICs) information from the technical manual.

The method of any preceding clause, wherein appending the selected keywords to the table to provide the master data includes appending the selected keywords to a spreadsheet file.

The method of any preceding clause, further including, prior to extracting the selected keywords, converting the technical manual from a first file type to a second file type.

The method of any preceding clause, wherein the first file type is a Standard Generalized Markup (SGM) or a Portable Document Format (PDF), and the second file type is an Extensible Markup Language (XML).

The method of any preceding clause, wherein, prior to receiving, by the computer system, the portion of the master data and the first table of labels corresponding to the portion of the master data, manually labelling the portion of the master data to generate the first table of labels.

The method of any preceding clause, further including performing, by the computer system, a text pre-processing of the master data to format the master data to provide pre-processed data, wherein performing, by the computer system, the text pre-processing of the master data includes performing the text pre-processing of the master data using PANDAS to provide PANDAS pre-processed data.

The method of any preceding clause, wherein performing, by the computer system, the text pre-processing of the master data includes removing null elements and stop words in the PANDAS pre-processed data to provide cleaned data.

The method of any preceding clause, wherein performing, by the computer system, the text pre-processing of the master data includes categorizing the cleaned data to provide the pre-processed data.

The method of any preceding clause, wherein applying, by the computer system, the Machine Learning model to the pre-processed data to generate the second table of labels corresponding to the entire master data includes converting the pre-processed data into Term Frequency-Inverse Document Frequency (TF-IDF) features to obtain a TF-IDF data.

The method of any preceding clause, wherein applying, by the computer system, the Machine Learning model to the pre-processed data to generate the second table of labels corresponding to the entire master data includes applying a chi-squared test to determine a correlation in the TF-IDF data.

The method of any preceding clause, further including inputting, in the computer system, a result of a chi-squared test to the machine learning model to obtain the second table of labels.

The method of any preceding clause, wherein the Machine Learning model includes a Linear Support Vector Machine (SVM) Classifier.

The method of any preceding clause, wherein the master data includes master inspection characteristics (MICs) information.

The method of any preceding clause, further including prior to appending, by the computer system, the selected keywords to a table to provide the master data, creating a domain-based lexicons and appending, by the computer system, the selected keywords to the table to provide the master data based on the domain-based lexicons.

The method of any preceding clause, wherein the data size of the technical manual is between 10 MB and 100 MB, and the data size of the second table of labels is between 1 MB and 2 MB.

The method of any preceding clause, wherein the technical manual is a manual of an aircraft engine, a manual of an aircraft system, or both.

The method of any preceding clause, further including self-tuning, by the computer system, the machine learning model based on the second table of labels corresponding to the master data.

A non-transitory computer-readable medium storing a computer-executable code that, when executed by a computer system causes the computer system to perform a method of extracting information from a technical manual including (a) extracting, by a computer system, selected keywords from the technical manual, (b) appending, by the computer system, the selected keywords to a table to provide master data, (c) receiving, by the computer system, a portion of the master data and a first table of labels corresponding to portion of the master data, (d) applying, by the computer system, a Machine Learning model or a Natural Language Processing (NLP) model to the pre-processed data to generate a second table of labels corresponding to an entire master data, and (e) processing, the computer system, labels in the second table of labels to correspond the master data to enable a user to review or use, or both, information contained in the technical manual without reading or searching in the entire technical manual. The data-size of the technical manual is at least five times greater than a data-size of the second table of labels.

The non-transitory computer-readable medium of the preceding clause, further including performing a text pre-processing of the master data to format the master data to provide pre-processed data, wherein performing, by the computer system, the text pre-processing of the master data includes performing the text pre-processing of the master data using PANDAS to provide PANDAS pre-processed data.

Further aspects of the present disclosure are provided by the subject matter of the following clauses.

A method of extracting information from a technical manual, the method being implemented on a computer system comprising one or more processors, the method comprising extracting, by a computer system, selected keywords from the technical manual, appending, by the computer system, the selected keywords to a table to provide master data, receiving, by the computer system, a portion of the master data and a first table of labels corresponding to portion of the master data, applying, by the computer system, a Machine Learning model or a Natural Language Processing (NLP) model to generate a second table of labels corresponding to an entire master data, processing, by the computer system, labels in the second table of labels to correspond to the master data, and outputting, by the computer system, an updated second table of labels to match with the master data to extract information from the technical manual so as to enable a user to review or to use, or both, the information contained in the technical manual by reading labels of the updated second table of labels without reading or searching in the entire technical manual. The labels in the updated second table of labels are organized according to a maintenance checklist or suggestion for parameter adjustment. A data-size of the technical manual is at least five times greater than a data-size of the updated second table of labels.

The method of the preceding clause, extracting keywords from the technical manual comprising using a regular or a rational expression-based extraction procedure.

The method of any preceding clause, the master data comprising Master Inspection Characteristics (MICs) information from the technical manual.

The method of any preceding clause, appending the selected keywords to the table to provide the master data comprising appending the selected keywords to a spreadsheet file.

The method of any preceding clause, prior to receiving, by the computer system, the portion of the master data and the first table of labels corresponding to the portion of the master data, manually labelling the portion of the master data to generate the first table of labels.

The method of any preceding clause, further comprising inputting, in the computer system, a result of a chi-squared test to the machine learning model to obtain the second table of labels.

The method of any preceding clause, the Machine Learning model comprising a Linear Support Vector Machine (SVM) Classifier.

The method of any preceding clause, the master data comprising master inspection characteristics (MICs) information.

The method of any preceding clause, further comprising, prior to appending, by the computer system, the selected keywords to a table to provide the master data, creating domain-based lexicons and appending, by the computer system, the selected keywords to the table to provide the master data based on the domain-based lexicons.

The method of any preceding clause, the data size of the technical manual being between 10 MB and 100 MB, and the data size of the second table of labels is between 1 MB and 2 MB.

The method of any preceding clause, the technical manual being a manual of an aircraft engine, a manual of an aircraft system, or both.

The method of any preceding clause, further comprising self-tuning, by the computer system, the machine learning model based on the second table of labels corresponding to the master data.

The method of any preceding clause, further comprising, prior to extracting the selected keywords, converting the technical manual from a first file type to a second file type.

The method of any preceding clause, the first file type being a Standard Generalized Markup (SGM) or a Portable Document Format (PDF), and the second file type is an Extensible Markup Language (XML).

The method of any preceding clause, further comprising performing, by the computer system, a text pre-processing of the master data to format the master data to provide pre-processed data, performing, by the computer system, the text pre-processing of the master data comprising performing the text pre-processing of the master data using PANDAS to provide PANDAS pre-processed data.

The method of any preceding clause, performing, by the computer system, the text pre-processing of the master data comprising removing null elements and stop words in the PANDAS pre-processed data to provide cleaned data.

The method of any preceding clause, performing, by the computer system, the text pre-processing of the master data comprising categorizing the cleaned data to provide the pre-processed data.

The method of any preceding clause, applying, by the computer system, the Machine Learning model to the pre-processed data to generate the second table of labels corresponding to the entire master data comprising converting the pre-processed data into Term Frequency-Inverse Document Frequency (TF-IDF) features to obtain a TF-IDF data.

The method of any preceding clause, applying, by the computer system, the Machine Learning model to the pre-processed data to generate the second table of labels corresponding to the entire master data comprising applying a chi-squared test to determine a correlation in the TF-IDF data.

A non-transitory computer-readable medium storing a computer-executable code that, when executed by a computer system, causes the computer system to perform a method of extracting information from a technical manual, the method comprising extracting, by a computer system, selected keywords from the technical manual, appending, by the computer system, the selected keywords to a table to provide master data, receiving, by the computer system, a portion of the master data and a first table of labels corresponding to a portion of the master data, performing, by the computer system, a text pre-processing of the master data to format the master data to provide pre-processed data, applying, by the computer system, a Machine Learning model or a Natural Language Processing (NLP) model to the pre-processed data to generate a second table of labels corresponding to an entire master data, processing, by the computer system, labels in the second table of labels to correspond to the master, and outputting, by the computer system, an updated second table of labels to match with the master data to extract information from the technical manual so as to enable a user to review or to use, or both, the information contained in the technical manual by reading labels of the updated second table of labels without reading or searching in the entire technical manual. The labels in the updated second table of labels are organized according to a maintenance checklist or suggestion for parameter adjustment. A data-size of the technical manual is at least five times greater than a data-size of the updated second table of labels.

Although the foregoing description is directed to the preferred embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. A method of extracting information from a technical manual, the method being implemented on a computer system comprising one or more processors, the method comprising:
   extracting, by a computer system, selected keywords from the technical manual;
   appending, by the computer system, the selected keywords to a table to provide master data;
   receiving, by the computer system, a portion of the master data and a first table of labels corresponding to the portion of the master data;
   applying, by the computer system, a Machine Learning model or a Natural Language Processing (NLP) model to generate a second table of labels corresponding to an entire master data;
   processing, by the computer system, labels in the second table of labels to correspond to the master data; and
   outputting, by the computer system, an updated second table of labels to match with the master data to extract information from the technical manual so as to enable a user to review or to use, or both, the information contained in the technical manual by reading labels of the updated second table of labels without reading or searching in the entire technical manual,
   wherein the labels in the updated second table of labels are organized according to a maintenance checklist or a suggestion for parameter adjustment, and a data-size of the technical manual is at least five times greater than a data-size of the updated second table of labels.

2. The method of claim 1, wherein extracting keywords from the technical manual comprises using a regular or a rational expression-based extraction procedure.

3. The method of claim 1, wherein the master data comprises Master Inspection Characteristics (MICs) information from the technical manual.

4. The method of claim 1, wherein appending the selected keywords to the table to provide the master data comprises appending the selected keywords to a spreadsheet file.

5. The method of claim 1, wherein, prior to receiving, by the computer system, the portion of the master data and the first table of labels corresponding to the portion of the master data, manually labelling the portion of the master data to generate the first table of labels.

6. The method of claim 1, further comprising inputting, in the computer system, a result of a chi-squared test to the machine learning model to obtain the second table of labels.

7. The method of claim 1, wherein the Machine Learning model comprises a Linear Support Vector Machine (SVM) Classifier.

8. The method of claim 1, wherein the master data comprises master inspection characteristics (MICs) information.

9. The method of claim 1, further comprising, prior to appending, by the computer system, the selected keywords to a table to provide the master data, creating domain-based lexicons and appending, by the computer system, the selected keywords to the table to provide the master data based on the domain-based lexicons.

10. The method of claim 1, wherein the data-size of the technical manual is between 10 MB and 100 MB, and the data-size of the second table of labels is between 1 MB and 2 MB.

11. The method of claim 1, wherein the technical manual is a manual of an aircraft engine, a manual of an aircraft system, or both.

12. The method of claim 1, further comprising self-tuning, by the computer system, the machine learning model based on the updated second table of labels corresponding to the master data.

13. The method of claim 1, further comprising, prior to extracting the selected keywords, converting the technical manual from a first file type to a second file type.

14. The method of claim 13, wherein the first file type is a Standard Generalized Markup (SGM) or a Portable Document Format (PDF), and the second file type is an Extensible Markup Language (XML).

15. The method of claim 1, further comprising performing, by the computer system, a text pre-processing of the master data to format the master data to provide pre-processed data, wherein performing, by the computer system, the text pre-processing of the master data comprises performing the text pre-processing of the master data using PANDAS to provide PANDAS pre-processed data.

16. The method of claim 15, wherein performing, by the computer system, the text pre-processing of the master data comprises removing null elements and stop words in the PANDAS pre-processed data to provide cleaned data.

17. The method of claim 16, wherein performing, by the computer system, the text pre-processing of the master data comprises categorizing the cleaned data to provide the pre-processed data.

18. The method of claim 1, wherein applying, by the computer system, the Machine Learning model comprises applying, by the computer system, the Machine Learning model to pre-processed data to generate the second table of labels corresponding to the entire master data comprises converting the pre-processed data into Term Frequency-Inverse Document Frequency (TF-IDF) features to obtain a TF-IDF data.

19. The method of claim 18, wherein applying, by the computer system, the Machine Learning model comprises applying, by the computer system, the Machine Learning model to the pre-processed data to generate the second table of labels corresponding to the entire master data comprises applying a chi-squared test to determine a correlation in the TF-IDF data.

20. A non-transitory computer-readable medium storing a computer-executable code that, when executed by a computer system, causes the computer system to perform a method of extracting information from a technical manual, the method comprising:

extracting, by a computer system, selected keywords from the technical manual;

appending, by the computer system, the selected keywords to a table to provide master data;

receiving, by the computer system, a portion of the master data and a first table of labels corresponding to the portion of the master data;

performing, by the computer system, a text pre-processing of the master data to format the master data to provide pre-processed data;

applying, by the computer system, a Machine Learning model or a Natural Language Processing (NLP) model to the pre-processed data to generate a second table of labels corresponding to an entire master data; and processing, by the computer system, labels in the second table of labels to correspond to the master data; and outputting, by the computer system, an updated second table of labels to match with the master data to extract information from the technical manual so as to enable a user to review or to use, or both, the information contained in the technical manual by reading labels of the updated second table of labels without reading or searching in the entire technical manual, wherein the labels in the updated second table of labels are organized according to a maintenance checklist or a suggestion for parameter adjustment, and a data-size of the technical manual is at least five times greater than a data-size of the updated second table of labels.

* * * * *